(12) United States Patent
Avrahami et al.

(10) Patent No.: US 10,216,958 B2
(45) Date of Patent: Feb. 26, 2019

(54) MINIMIZING SENSITIVE DATA EXPOSURE DURING PREPARATION OF REDACTED DOCUMENTS

(71) Applicant: International Business Machines Corporation, Armonk, NY (US)

(72) Inventors: Shlomit Avrahami, Jerusalem (IL); Joshua Fox, Emek Haela (IL); Yuri Kosharovsky, Givat Zeev (IL); Michael Pelts, Tzur Hadassah (IL); Vladislav P. Rybak, Ofakim (IL); Ora Shapiro, Ashkelon (IL)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 14/687,500

(22) Filed: Apr. 15, 2015

(65) Prior Publication Data
US 2015/0220758 A1    Aug. 6, 2015

Related U.S. Application Data

(60) Division of application No. 13/541,606, filed on Jul. 3, 2012, now Pat. No. 9,043,929, which is a
(Continued)

(51) Int. Cl.
*G06F 21/62* (2013.01)
*H04L 9/08* (2006.01)
(Continued)

(52) U.S. Cl.
CPC .......... *G06F 21/6254* (2013.01); *G06F 21/10* (2013.01); *G06F 21/6245* (2013.01); *H04L 9/085* (2013.01); *H04L 67/10* (2013.01)

(58) Field of Classification Search
CPC .................. G06F 21/6245; G06F 3/04895
See application file for complete search history.

(56) References Cited

U.S. PATENT DOCUMENTS

| 4,962,475 A | 10/1990 | Hernandez et al. |
| 5,581,682 A | 12/1996 | Anderson et al. |

(Continued)

OTHER PUBLICATIONS

Autodesk, Inc., "Design Review—Multiple Simultaneous Reviews", Autodesk Design Review Discussion Forum, [online], © 2010 Autodesk, Inc., [Retrieved on May 16, 2011], Retrieved from the Internet at <URL: http://forums.autodesk.com/t5/Autodesk-Design-Review/Design-Review-Multiple_Simultaneous-Reviews/m-p/2753638>, 5 pp.

(Continued)

*Primary Examiner* — Jason Chiang
(74) *Attorney, Agent, or Firm* — Janaki K. Davda; Konrad, Raynes, Davda and Victor LLP

(57) ABSTRACT

A document review and security technique is provided that presents a first portion of a document to a first reviewer, wherein the first portion includes less than the entire document, presents a second portion of the document to a second reviewer, wherein the second portion includes less than the entire document, wherein the second portion is at least partially different from the first portion, and wherein the first reviewer and the second reviewer are different reviewers, receives from the first reviewer a review action input associated with the first portion, receives from the second reviewer a review action input associated with the second portion, and determines a disposition of the document in accordance with the review action inputs.

12 Claims, 10 Drawing Sheets

Related U.S. Application Data continuation of application No. 13/113,923, filed on May 23, 2011, now Pat. No. 8,959,654.

(51) Int. Cl.
*G06F 21/10* (2013.01)
*H04L 29/08* (2006.01)

(56) References Cited

U.S. PATENT DOCUMENTS

| | | | |
|---|---|---|---|
| 5,706,452 | A | 1/1998 | Ivanov |
| 7,086,085 | B1 | 8/2006 | Brown et al. |
| 7,577,906 | B2 | 8/2009 | Friedrichowitz et al. |
| 7,664,751 | B2 | 2/2010 | O'Sullivan et al. |
| 7,802,305 | B1* | 9/2010 | Leeds ............... G06F 17/2735 715/230 |
| 7,805,673 | B2 | 9/2010 | der Quaeler et al. |
| 7,859,539 | B2 | 12/2010 | Beckman |
| 7,865,742 | B2 | 1/2011 | Staddon et al. |
| 7,865,827 | B2 | 1/2011 | Ball et al. |
| 7,873,838 | B2 | 1/2011 | Staddon et al. |
| 7,917,771 | B2 | 3/2011 | Florenza et al. |
| 7,962,853 | B2 | 6/2011 | Bedi et al. |
| 8,082,250 | B2 | 12/2011 | Dayon |
| 8,959,654 | B2 | 2/2015 | Avrahami et al. |
| 2003/0011631 | A1 | 1/2003 | Halahmi |
| 2003/0115481 | A1 | 6/2003 | Baird et al. |
| 2003/0131251 | A1 | 7/2003 | Fetkovich |
| 2003/0145017 | A1* | 7/2003 | Patton ............... G06F 17/218 |
| 2005/0004950 | A1 | 1/2005 | Ciaramitaro et al. |
| 2005/0197177 | A1* | 9/2005 | Charasika ............... B41L 1/22 462/28 |
| 2006/0085469 | A1 | 4/2006 | Pfeiffer et al. |
| 2006/0184865 | A1 | 8/2006 | Chakraborty |
| 2006/0242558 | A1 | 10/2006 | Racovolis et al. |
| 2006/0259524 | A1 | 11/2006 | Horton |
| 2006/0259614 | A1 | 11/2006 | Patrick |
| 2006/0282762 | A1 | 12/2006 | Diamond et al. |
| 2007/0029394 | A1 | 2/2007 | Wicker et al. |
| 2007/0030528 | A1* | 2/2007 | Quaeler ............ G06F 17/30634 358/453 |
| 2007/0136656 | A1 | 6/2007 | Nydam et al. |
| 2007/0186157 | A1 | 8/2007 | Walker et al. |
| 2008/0016372 | A1 | 1/2008 | Staddon et al. |
| 2008/0109454 | A1 | 5/2008 | Willse et al. |
| 2009/0162818 | A1* | 6/2009 | Kosakowski ............ G09B 5/06 434/157 |
| 2009/0222927 | A1* | 9/2009 | Pikus ................. G06F 17/5081 726/26 |
| 2009/0249085 | A1* | 10/2009 | Stransky ................ G06F 21/77 713/194 |
| 2009/0254807 | A1 | 10/2009 | Singh et al. |
| 2009/0327294 | A1 | 12/2009 | Bailor et al. |
| 2010/0070882 | A1 | 3/2010 | Wang et al. |
| 2010/0146435 | A1 | 6/2010 | Cros |
| 2010/0250541 | A1 | 9/2010 | Richards et al. |
| 2011/0035601 | A1* | 2/2011 | Davidson ................ G06F 21/14 713/190 |
| 2011/0066606 | A1 | 3/2011 | Fox et al. |
| 2012/0030165 | A1* | 2/2012 | Guirguis ............... G06F 19/322 707/607 |
| 2012/0054112 | A1 | 3/2012 | Gormish et al. |
| 2012/0167209 | A1* | 6/2012 | Molnar .................. G06F 21/54 726/22 |
| 2012/0185759 | A1 | 7/2012 | Balinsky et al. |
| 2012/0192059 | A1* | 7/2012 | Laskaris ............. G06F 17/2264 715/231 |
| 2013/0004075 | A1 | 1/2013 | Avrahami et al. |

OTHER PUBLICATIONS

Image Solutions, Inc., "AnnoDoc: Take Control of Your Content Review Process", [online] © 2011 Image Solutions, Inc., [Retrieved on May 16, 2011], Retrieved from the Internet at <URL: http://www.imagesolutions.com/software/annodoc.html>, 6 pp.

Informative Graphics Corp., "Informative Graphics Introduces New Redact-It Desktop with OCR and Microsoft Office Support for Multi-Format File Redaction", Press Release, [online] © 2011 Informative Graphics Corp., [Retrieved on May 16, 2011], retrieved from the Internet at <URL: http://www.infograph.com/press/Redact-It_Desktop1_1.asp>, 4 pp.

Informative Graphics Corp., "Redact-It Desktop", [online] © 2011 Informative Graphics Corp., [Retrieved on May 16, 2011], retrieved from the Internet at <URL: http://www.redact-it.com/redactit_desktop.htm>, 3 pp.

Microsoft Corp., "Word 2007 Redaction Tool", [online], © 2006-2011 Microsoft Corp., [Retrieved on May 16, 2011], Retrieved from the Internet at <URL: http://redaction.codeplex.com>, 2 pp.

U.S. Appl. No. 12/648,413, filed Dec. 29, 2009, entitled "Selecting Portions of Computer-Accessible Documents for Post-Selection Processing", invented by J. Fox, M. Pelts, and V.P. Rybak, Total 24 pp.

Office Action, dated Jan. 31, 2013, for U.S. Appl. No. 13/113,923, filed May 23, 2011, invented by Shlomit Avrahami et al., Total 29 pages.

Preliminary Amendment, dated Jul. 3, 2012, for U.S. Appl. No. 13/113,923, filed May 23, 2011, invented by Shlomit Avrahami et al., Total 8 pages.

Restriction Requirement, dated Oct. 29, 2012, for U.S. Appl. No. 13/113,923, filed May 23, 2011, invented by Shlomit Avrahami et al., Total 6 pages.

Response to Restriction Requirement, dated Nov. 27, 2012, for U.S. Appl. No. 13/113,923, filed May 23, 2011, invented by Shlomit Avrahami et al., Total 6 pages.

Response to Office Action, dated Apr. 30, 2013, for U.S. Appl. No. 13/113,923, filed May 23, 2011, invented by Shlomit Avrahami et al., Total 11 pages.

U.S. Appl. No. 13/113,923, filed May 23, 2011, invented by Avrahami, S., J. Fox, V. Kosharovsky, M. Pelts, V.P. Rybak, and O. Shapiro, Total 31 pp.

Final Office Action, dated Jun. 21, 2013, for U.S. Appl. No. 13/113,923, filed May 23, 2011, invented by Shlomit Avrahami et al., Total 25 pages.

Response to Final Office Action, dated Oct. 14, 2013, for U.S. Appl. No. 13/113,923, filed May 23, 2011, invented by Shlomit Avrahami et al., Total 9 pages.

Office Action, dated Dec. 3, 2013, for U.S. Appl. No. 13/113,923, filed May 23, 2011, invented by Shlomit Avrahami et al., Total 23 pages.

Response to Office Action, dated Mar. 3, 2014, for U.S. Appl. No. 13/113,923, filed May 23, 2011, invented by Shlomit Avrahami et al., Total 10 pages.

Final Office Action, dated May 5, 2014, for U.S. Appl. No. 13/113,923, filed May 23, 2011, invented by Shlomit Avrahami et al., Total 23 pages.

Response to Final Office Action, dated Aug. 5, 2014, for U.S. Appl. No. 13/113,923, filed May 23, 2011, invented by Shlomit Avrahami et al., Total 7 pages.

Notice of Allowance, dated Oct. 7, 2014, for U.S. Appl. No. 13/113,923, filed May 23, 2011, invented by Shlomit Avrahami et al., Total 14 pages.

Office Action, dated Feb. 4, 2013, for U.S. Appl. No. 13/541,606, filed Jul. 3, 2012, invented by Shlomit Avrahami et al., Total 26 pages.

Response to Office Action, dated Apr. 30, 2013, for U.S. Appl. No. 13/541,606, filed Jul. 3, 2012, invented by Shlomit Avrahami et al., Total 8 pages.

Preliminary Amendment, dated Jul. 3, 2012, for U.S. Appl. No. 13/541,606, filed Jul. 3, 2012, invented by Shlomit Avrahami et al., Total 11 pages.

Restriction Requirement, dated Oct. 30, 2012, for U.S. Appl. No. 13/541,606, filed Jul. 3, 2012, invented by Shlomit Avrahami et al., Total 6 pages.

(56) References Cited

OTHER PUBLICATIONS

Response to Restriction Requirement, dated Nov. 27, 2012, for U.S. Appl. No. 13/541,606, filed Jul. 3, 2012, invented by Shlomit Avrahami et al., Total 4 pages.
US Patent Application, dated Jul. 3, 2012, for U.S. Appl. No. 13/541,606, filed Jul. 3, 2012, invented by Shlomit Avrahami et al., Total 31 pages.
Final Office Action, dated Jun. 20, 2013, for U.S. Appl. No. 13/541,606, filed Jul. 3, 2012, invented by Shlomit Avrahami et al., Total 23 pages.
Response to Final Office Action, dated Oct. 14, 2013, for U.S. Appl. No. 13/541,606, filed Jul. 3, 2012, invented by Shlomit Avrahami et al., Total 9 pages.
Office Action, dated Dec. 18, 2013, for U.S. Appl. No. 13/541,606, filed Jul. 3, 2012, invented by Shlomit Avrahami et al., Total 22 pages.
Response to Office Action, dated Mar. 3, 2014, for U.S. Appl. No. 13/541,606, filed Jul. 3, 2012, invented by Shlomit Avrahami et al., Total 10 pages.
Final Office Action, dated May 6, 2014, for U.S. Appl. No. 13/541,606, filed Jul. 3, 2012, invented by Shlomit Avrahami et al., Total 24 pages.
Response to Final Office Action, dated Aug. 5, 2014, for U.S. Appl. No. 13/541,606, filed Jul. 3, 2012, invented by Shlomit Avrahami et al., Total 5 pages.
Notice of Allowance, dated Jan. 14, 2015, for U.S. Appl. No. 13/541,606, filed Jul. 3, 2012, invented by Shlomit Avrahami et al., Total 19 pages.

* cited by examiner

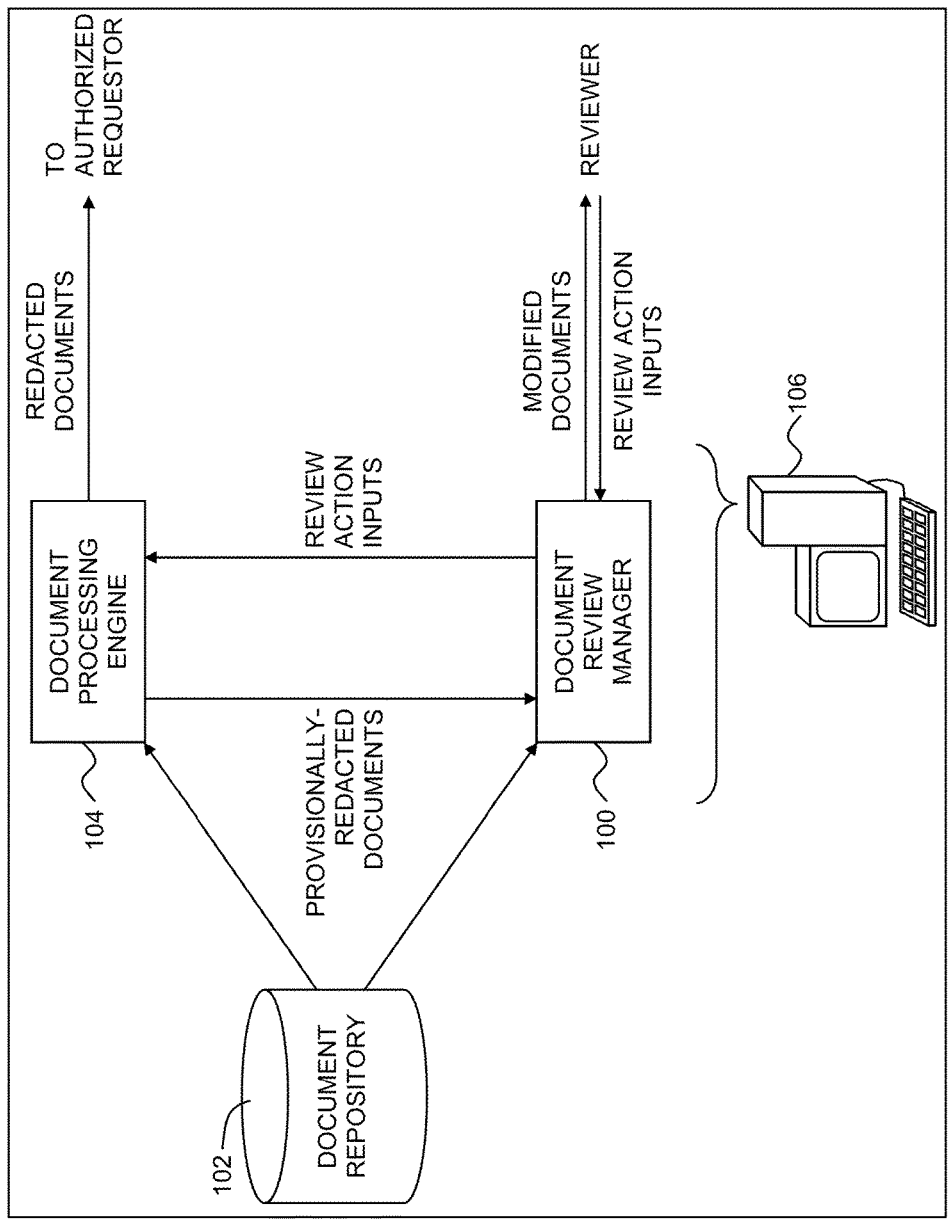

Dear Mr. Johnson,

As discussed in our meeting at your office last Tuesday, I would like to begin the term of my automotive insurance policy #2818-2834-8382-8128, in my name (social security number 387-22-2929) and that of my husband Arthur Burnett (SSN 389-55-2383) for the 2005 Ford Taurus. At the time, I filled out the form but asked to defer it until I had transferred ownership of the vehicle.

Please bill the premium of $2100 to my MasterCard, number 345730985038781, expiration date 10/01/2012.

Please also continue the existing insurance policy #2338-2464-2343-1234 for my 2008 Prius without change.

Regards,

Jennifer Burnett

Fig. 2B

As discussed in our meeting at your office last Tuesday, I would like to begin the term of my automotive insurance policy #2818-2834-8382-8128, in my name (social security number 387-22-2929) and that of my husband Arthur Burnett (SSN 389-55-2383) for the 2005 Ford Taurus. At the time, I filled out the form but asked to defer it until I had transferred ownership of the vehicle.

Please also continue the existing insurance policy #2338-2464-2343-1234 for my 2008 Prius without change.

Jennifer Burnett

Fig. 2C

Dear Mr. Johnson,

███████████████████████████████████████

Please bill the premium of $2100 to my MasterCard, number 345730985038781, expiration date 10/01/2012.

███████████████████████████████████████

Regards,

MINIMIZING SENSITIVE DATA EXPOSURE DURING PREPARATION OF REDACTED DOCUMENTS

BACKGROUND

Embodiments of the invention relate to computer data access control and privacy in general.

Many organizations maintain documents and data files that include information, such as of a medical or financial nature, that is deemed sensitive and whose exposure to individuals is restricted by company policy, or even by law. Such organizations may employ document redaction software that removes sensitive information from documents before they are shown to individuals requesting access to such documents. Document redaction software typically removes sensitive information from documents automatically according to a set of predefined rules. However, post-redaction review by a human reviewer is typically required to ensure that sensitive data is properly identified as such within a document and is redacted accordingly. This typically requires that the reviewer be given access to the pre-redacted contents of a document as well. However, where exposure to sensitive information is restricted to individuals with specific legal and/or professional qualifications, such as licensed medical professionals, it is often difficult and expensive to engage such individuals to perform post-redaction review.

SUMMARY OF THE INVENTION

In one aspect of the invention, a document review and security method, system, and computer-program product are provided that presents a first portion of a document to a first reviewer, wherein the first portion includes less than the entire document, presents a second portion of the document to a second reviewer, wherein the second portion includes less than the entire document, wherein the second portion is at least partially different from the first portion, and wherein first reviewer and the second reviewer are different reviewers, receives from the first reviewer a review action input associated with the first portion, receives from the second reviewer a review action input associated with the second portion, and determines a disposition of the document in accordance with the review action inputs.

In another aspect of the invention, a document review and security method, system, and computer-program product are provided that identify a first element within a first document that is contextually related to a second element within the first document in accordance with predefined contextual relationship criteria, create a second document including the first element, the second element, and a third element, wherein the third element is not interposed between the first element and the second element within the first document, and wherein the third element is interposed between the first element and the second element within the second document, present the second document to a reviewer, receive a review action input from the reviewer, and determine a disposition of the first document in accordance with the review action inputs.

BRIEF DESCRIPTION OF THE SEVERAL VIEWS OF THE DRAWINGS

The invention will be understood and appreciated more fully from the following detailed description taken in conjunction with the appended drawings in which:

FIG. 1 is a simplified conceptual illustration of a document redaction and review system, constructed and operative in accordance with embodiments of the invention;

FIGS. 2B, 2C, and 2D show a document before and after pre-review modification, useful in understanding the method of FIG. 2A, in accordance with embodiments of the invention;

DETAILED DESCRIPTION

Figure 2A:
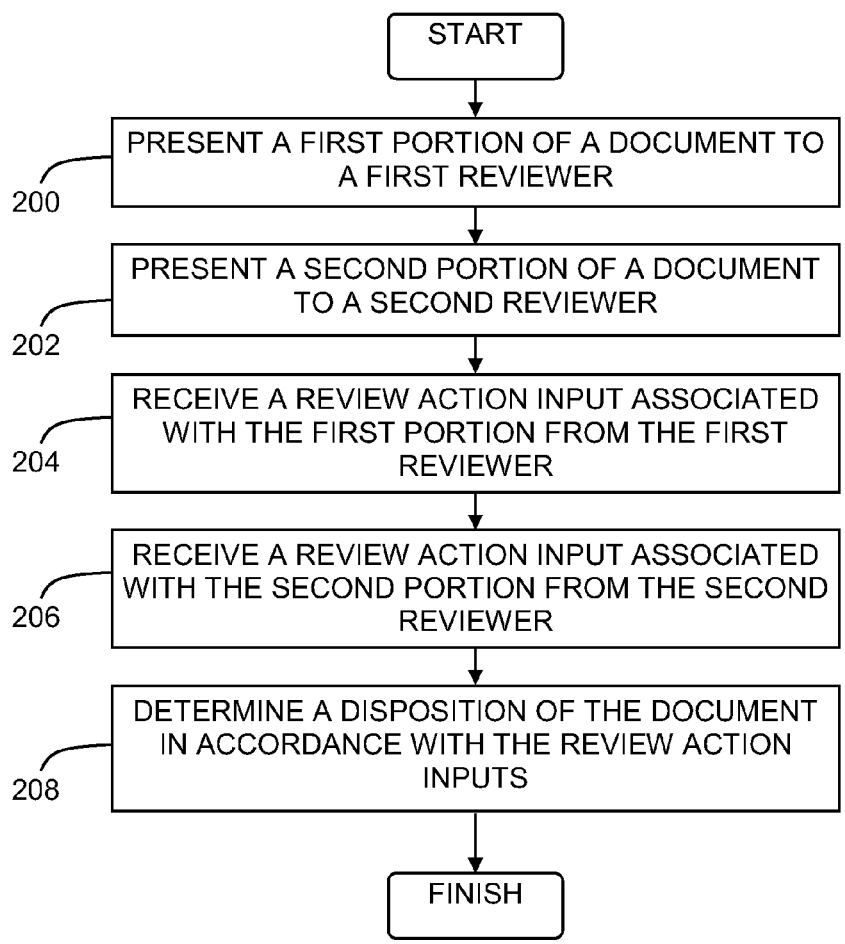
FIG. 2A is a simplified flowchart illustration of an exemplary technique of operation of the system of FIG. 1, operative in accordance with embodiments of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a document redaction and review system, constructed and operative in accordance with embodiments of the invention. In the system of FIG. 1, a document review manager 100 is configured to process computer-viewable documents, such as may reside in a document repository 102 stored on a computer readable data storage device, and/or process such documents after they have been provisionally redacted by a document processing engine 104 that is configured to redact computer-viewable documents in accordance with conventional techniques. Document review manager 100 is configured to process such documents by preparing modified versions of the documents and presenting the modified documents to one or more reviewers. Document review manager 100 is configured to receive review action inputs from reviewers of the modified documents and provide the review action inputs to document processing engine 104. Document processing engine 104 is configured to determine the disposition of a computer-viewable document, that has not been redacted or that has been provisionally redacted, in accordance with the review action inputs, such as by redacting or further redacting the document, approving a provisionally-redacted document, and/or classifying the document (i.e., assigning a classification to the document). Document processing engine 104 may then provide post-review redacted documents to authorized requestors in accordance with conventional techniques. Any of the elements shown in FIG. 1 are preferably executed by, or are otherwise accessible to, a computer 106, such as by implementing any of the elements in computer hardware and/or in computer software embodied in a physically-tangible, computer readable medium in accordance with conventional techniques. Various exemplary techniques of operation of the system of FIG. 1 are described hereinbelow.

Reference is now made to FIG. 2A which is a simplified flowchart illustration of an exemplary technique of operation of the system of FIG. 1, operative in accordance with embodiments of the invention. In the method of FIG. 2A, a first portion of a computer-viewable document is presented to a first reviewer, where the first portion includes less than the entire document (block 200). A second portion of the document is presented to a second reviewer, where the second portion includes less than the entire document, where the second portion differs from the first portion, and where the second reviewer is someone other than the first reviewer (i.e., where the first reviewer and the second reviewer are different reviewers) (block 202). For example, two modified versions of the document shown in FIG. 2B may be prepared as the modified document shown in FIG. 2C that includes a portion of the document shown in FIG. 2B and the modified document shown in FIG. 2D that includes a different portion of the document shown in FIG. 2B. A review action input associated with the first portion is received from the first reviewer (block 204). A review action input associated with the second portion is received from the second reviewer (block 206). A review action input may, for example, indicate that a specific portion of the document be redacted, or that a provisionally-redacted document appears to be properly (i.e., correctly) redacted. Additionally or alternatively, a review action input may, for example, indicate that the document should be classified as "confidential medical," and that a security constraint be imposed on the document, such as where the document may be shown only to medical doctors. A disposition of the document is determined in accordance with the review action inputs (block 208) as described hereinabove.

In the method of FIG. 2A, when preparing a modified version of the document, a first element within the document may be identified that is contextually related to a second element within the document in accordance with predefined contextual relationship criteria, whereupon the first element, but not the second element, is included within the portion of the document that is included in the modified version. Thus, for example, a credit card number may be identified within the document as being contextually related to a credit card expiration date within the same document, whereupon a modified version of the document is presented to one reviewer that includes the credit card number but not the credit card expiration date, while a different modified version of the document is presented to a different reviewer that includes the credit card expiration date but not the credit card number. Similarly, a hospital patient's identification details and the patient's medical diagnosis that appear in the same document are preferably shown to different reviewers in different modified versions of the document.

The document shown in FIG. 2B exposes the full customer's credit card details, including card owner name, number, and expiration time. However, embodiments allow different reviewers review to review different document paragraphs, as is illustrated with FIG. 2C and FIG. 2D.

Figure 3:
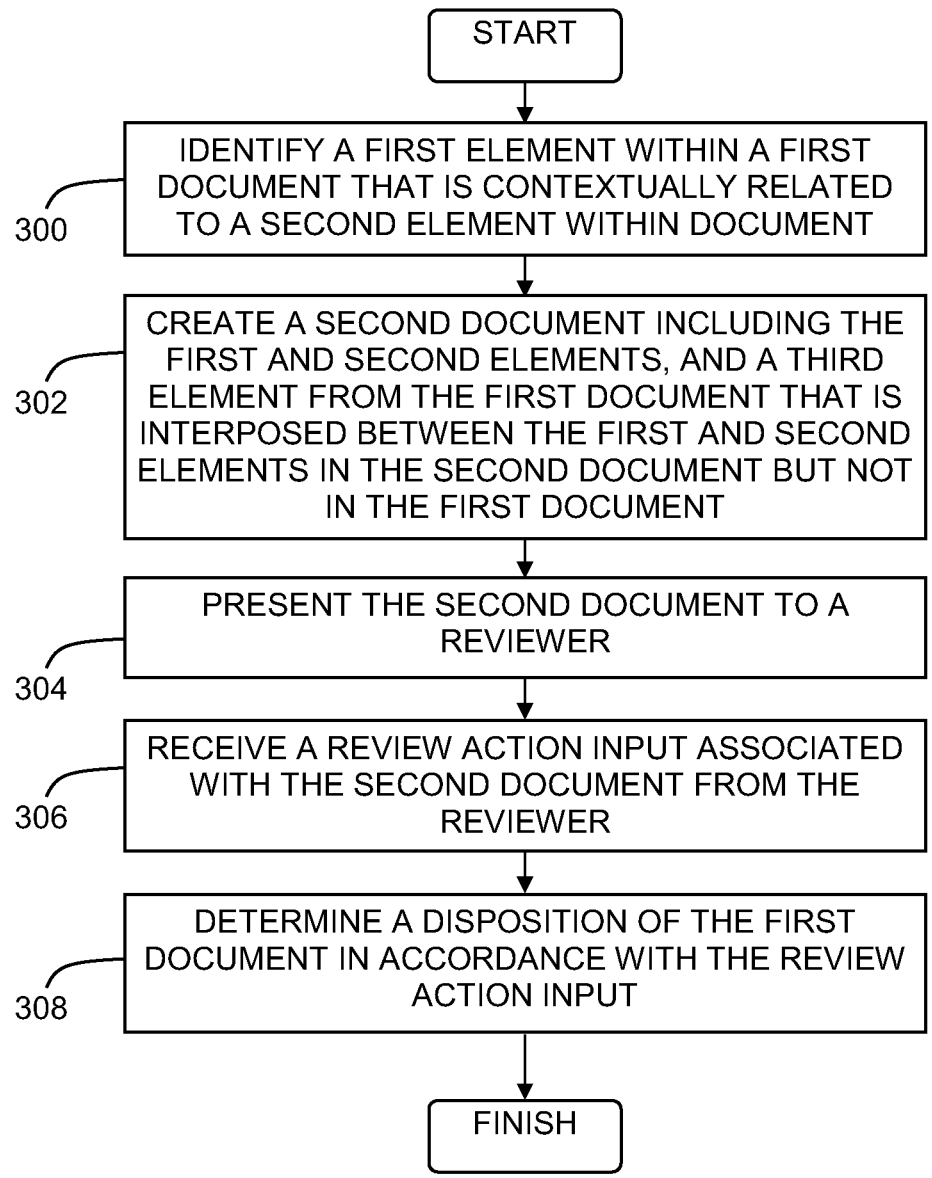
FIGS. 3-6 are simplified flowchart illustrations of exemplary techniques of operation of the system of FIG. 1, operative in accordance with alternative embodiments of the invention.

Reference is now made to FIG. 3 which is a simplified flowchart illustration of an additional exemplary technique of operation of the system of FIG. 1, operative in accordance with embodiments of the invention. In the method of FIG. 3, a first element is identified within a first computer-viewable document that is contextually related to a second element within the first document in accordance with predefined contextual relationship criteria (block 300), such as a credit card number within a document that is contextually related to the name of a credit card holder within the same document. A second computer-viewable document is created including the first element, the second element, and a third element from the first document, where the third element is not interposed between the first element and the second element within the first document, and where the third element is interposed between the first element and the second element within the second document (block 302). Thus, for example, a second document is created that includes the credit card number and the credit card holder's name, where one or more words, sentences, or paragraphs that are found within the first document in a location other than between the credit card number and the credit card holder's name, are interposed between the credit card number and the credit card holder's name. The second document is presented to a reviewer (block 304). A review action input associated with the second document is received from the reviewer (block 306). A disposition of the first document is determined in accordance with the review action inputs (block 308) as described hereinabove.

Figure 4:
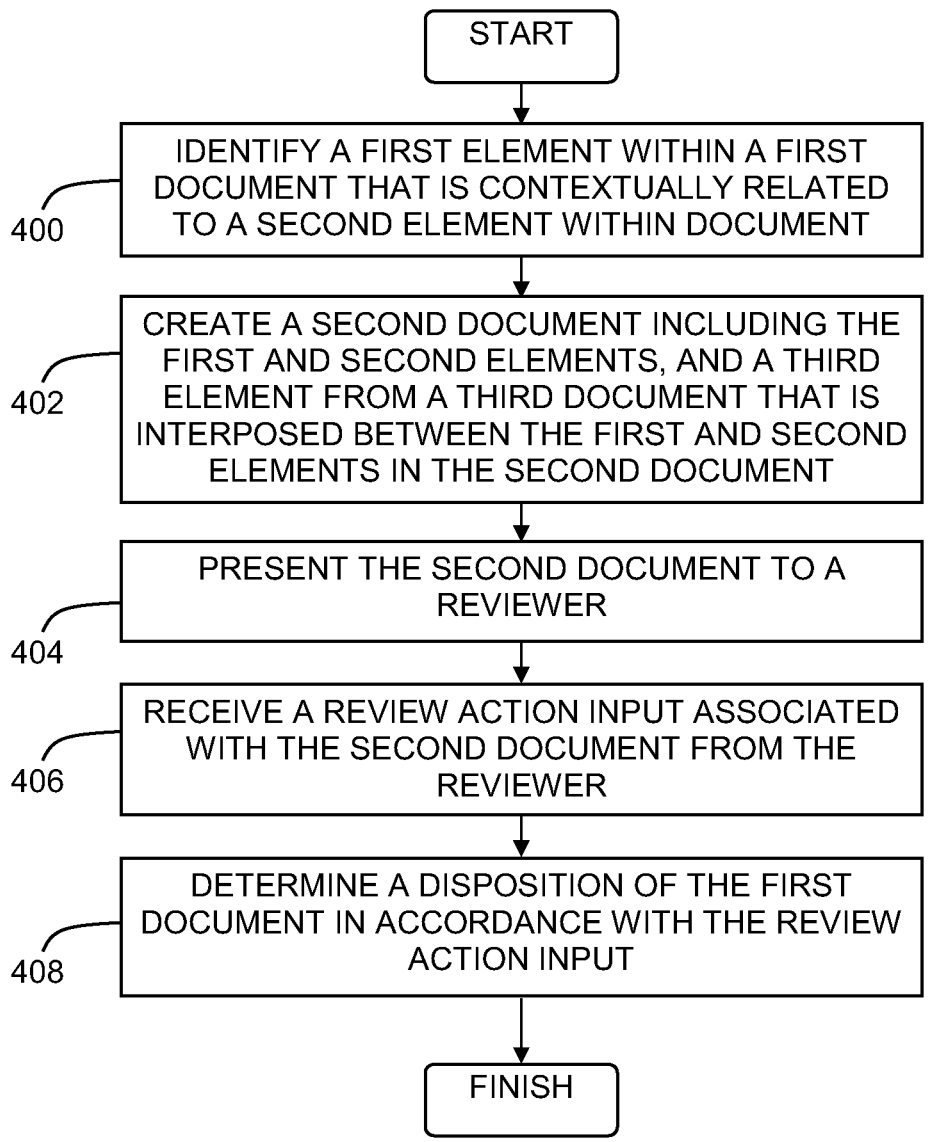

Reference is now made to FIG. 4 which is a simplified flowchart illustration of an additional exemplary technique of operation of the system of FIG. 1, operative in accordance with embodiments of the invention. In the method of FIG. 4, a first element is identified within a first computer-viewable document that is contextually related to a second element within the first document in accordance with predefined contextual relationship criteria (block 400). A second computer-viewable document is created including the first element, the second element, and a third element from a third computer-viewable document, where the third element is interposed between the first element and the second element within the second document (block 402). The second document is presented to a reviewer (block 404). A review action input associated with the second document is received from the reviewer (block 406). A disposition of any of the documents is determined in accordance with the review action inputs (block 408) as described hereinabove. The method of FIG. 4 differs from the method of FIG. 3 as the method of FIG. 3 involves elements from only one document, whereas in the method of FIG. 4 elements of one document are interposed between contextually-related elements of another document. For example, if a medical document relating to a given patient is to be reviewed to identify sensitive information within the document, information from other medical documents relating to other patients may be interposed between contextually-related elements of the reviewed document to make it difficult to determine which information relates to the given patient, thereby protecting the given patient's privacy.

Figure 5:
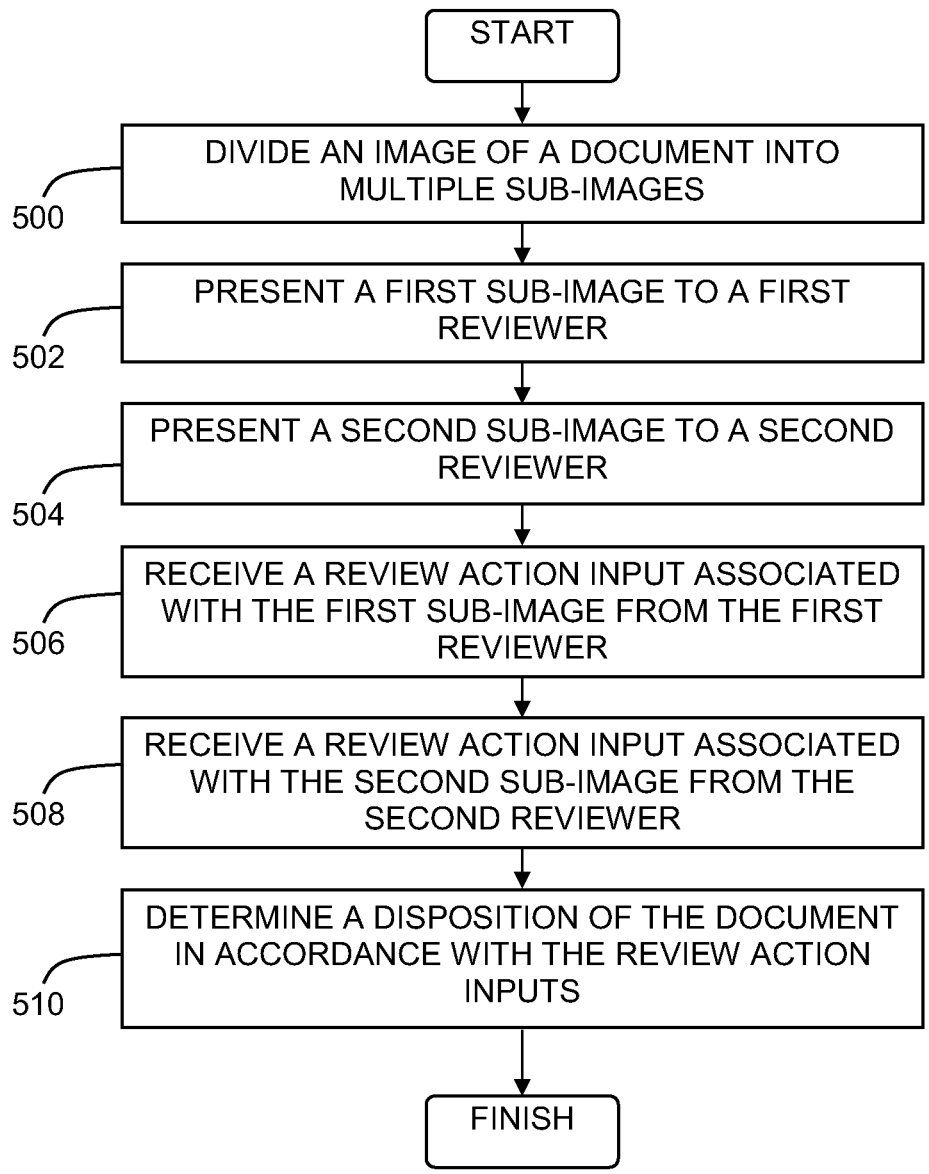

Reference is now made to FIG. 5 which is a simplified flowchart illustration of an additional exemplary technique of operation of the system of FIG. 1, operative in accordance with embodiments of the invention. In the method of FIG. 5, an image of a document is divided into multiple sub-images, where each of the sub-images includes a contiguous area of the document that is less than the entire area of the document, and where each of the sub-images is at least partially different from the other sub-images (block 500). A sub-image may be of any shape, and the various sub-images may be of different shapes. Preferably, the sub-images collectively cover the entire document, and sub-images of adjacent areas of the document may overlap. A first sub-image of the document is presented to a first reviewer (block 502). A review action input associated with the first sub-image is received from the first reviewer (block 504). A second sub-image of the document is presented to a second reviewer, where the second sub-image differs from the first sub-image, and where the second reviewer is someone other than the first reviewer (block 506). A review action input associated with the second sub-image is received from the second reviewer (block 508). A disposition of the document is determined in accordance with the review action inputs (block 510) as described hereinabove.

In the method of FIG. 5, if a reviewer is unable to provide a review action due to a lack of information relating to a given sub-image being reviewed by the reviewer, such as where context information for part or all of the contents of the given sub-image can only be determined by viewing part or all of the contents of one or more sub-images that are adjacent to the given sub-image, the reviewer may request permission to view one or more sub-images that are adjacent to the given sub-image. The extent of an adjacent sub-image that is shown to a reviewer who makes such a request may be predefined by an administrator of the system of FIG. 1 using any criteria, such as a number of words, sentences, paragraphs, or centimeters deep within the adjacent sub-image from its border with the given sub-image previously provided to the reviewer. Requests by reviewers to view adjacent sub-images are preferably logged for auditing purposes.

In certain embodiments, the document page-image is divided into geometric parts, and these parts are presented one at a time to the reviewer. For example, a page can be split into rectangles—horizontally, vertically, diagonally, etc.—or into other geometric shapes which completely cover the page is possible. The way documents are divided may be defined by an administrator before the process of redaction-review begins. The divided parts may partially overlap.

In certain embodiments, if the presented section of the document is the single word and "888" is presented, or if the data is on the edge of a geometric section, it might be difficult to define whether the context-less data should be redacted. In such scenarios, the reviewer can see additional context surrounding the data. Optionally, the context can be concealed at the review stage, yet revealed on request and logged for monitoring. The exposed context for a value "745" could be, on the one hand, "Car 745, produced in" or on the other hand "Personal Identification Number 745, valid", enabling the reviewer to distinguish text which should be redacted from text which should be exposed.

Figure 6:
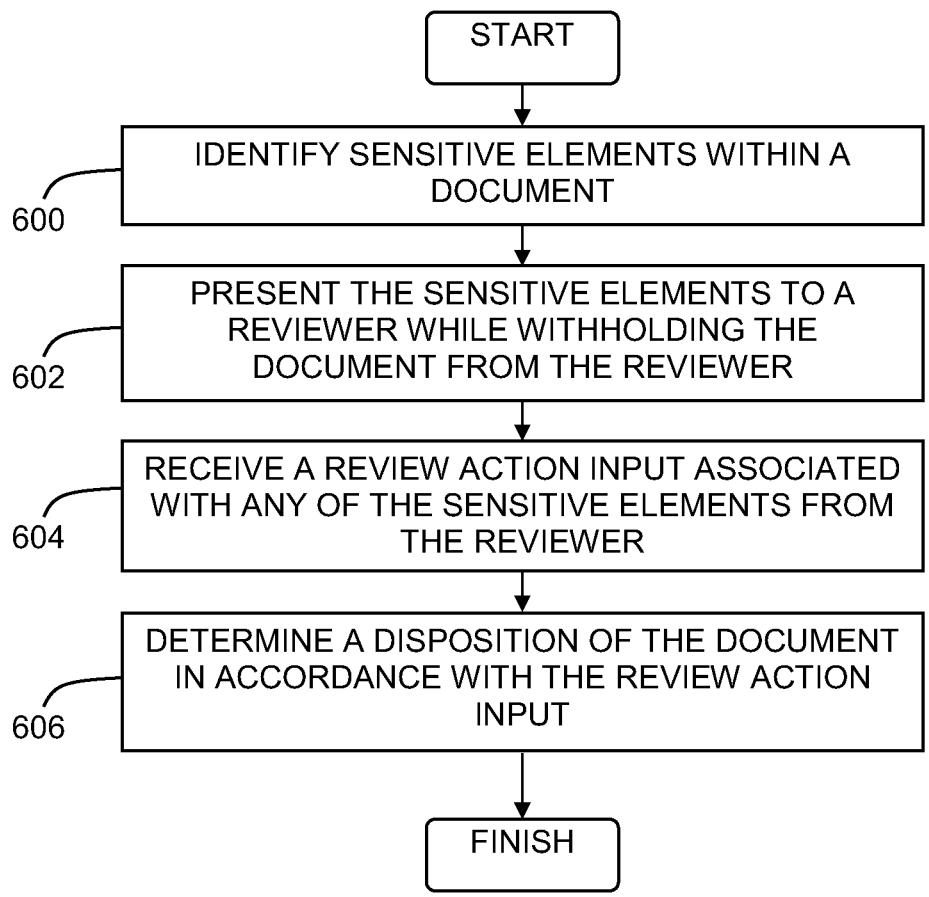

Reference is now made to FIG. 6 which is a simplified flowchart illustration of an additional exemplary technique of operation of the system of FIG. 1, operative in accordance with embodiments of the invention. In the method of FIG. 6, one or more sensitive elements within an computer-viewable document are identified in accordance with sensitivity criteria (block 600). The sensitive elements are presented to a reviewer while withholding the document from the reviewer (block 602). A review action input associated with any of the sensitive elements is received from the reviewer (block 604). A security constraint previously imposed upon the document is removed in accordance with the review action input (block 606). For example, if a word in a document was identified as being sensitive, resulting in a security constraint being imposed upon the document, such as by redacting the word from the document, the reviewer may indicate in a review action that the word should not have been identified as being sensitive, whereupon the security constraint relating to the word is removed.

In will be appreciated that one or more of the above methods may be used in combination. In addition, computer-viewable documents or portions thereof that are presented to a reviewer as described hereinabove may have some or all of their data "de-identified" before being presented to the reviewer using conventional techniques, such as where all numeric data are replaced by randomly-generated numbers. Such processing may also be referred to as replacing data with deidentifying data. For example, before reviewing, all digits in a telephone number are replaced by "8", so that entities lose their content but keep their context. For example, if the reviewer sees that (+888)-888-8888 is presented, the reviewer knows that this is a phone number and verifies whether the phone number has been redacted correctly, while not being exposed to the actual phone number.

Furthermore, such documents or portions may have their data diluted before being presented to the reviewer using conventional techniques, such as where "dummy" data are inserted into a document or portion.

It will be appreciated that the methods described herein may be applied equally to documents that have not been redacted, as well as to documents that have been provisionally-redacted, such as by redaction software. It will be further appreciated that the methods described herein are applicable for any number of modified versions of a document that are provided to any number of reviewers, where each version includes a partially or completely different portion of the document.

It will be appreciated that the present invention enables reviewers of documents before redaction, as well as provisionally-redacted documents, to see the information they require for redaction review, while minimizing their exposure to sensitive information that might violate privacy policies.

Embodiments may split a document into sections, which are presented individually to one or more reviewers. The sections can each be a page, a paragraph, a sentence, a word, etc. For example, if the section is a word, a credit card number is shown without showing the neighboring data, which may be the person's name and credit card expiration date, so that the credit card number can not be illicitly used. As another example, if the document is split into a paragraph, the patient's personally identifying details may be shown separately from her diagnosis.

Embodiments provide shuffling. In particular, sections may be presented in a shuffled order to the reviewer or reviewers. Shuffling is within a document and among different documents. For example, if medical documents are reviewed, and the section is a paragraph, then paragraphs containing personal details and paragraphs containing medical information are presented from all documents in a shuffled manner. Thus, the reviewer is unable to match between a patient and a medical description.

Embodiments may be used to minimize false positive and false negative redactions. False positives are cases in which an entity (e.g., a word) is redacted which should not be, and false negatives are cases in which a entity (e.g., a word) should be redacted and is not. For false-positives, the original content of the redacted entities is presented to the reviewer to choose which entities have been mistakenly identified as sensitive. For false-negatives, the redacted document is presented to the reviewer, while the redacted entities are hidden. This may be the same redacted document which is presented to the end user. The reviewer is able to further scan the document to find sensitive entities that remain un-redacted and should be added to the set of redacted entities.

Embodiments allow verification of sensitive data identification by providing portions of a document to different reviewers. For example, each reviewer may be shown different parts of a redacted document. Such embodiments reduce the permission level required for the reviewer to review the document.

With embodiments, a redacted document is transformed in a special way such that snippets of sensitive data can be reviewed independently by a single or by multiple reviewers. Embodiments enable the reviewer to decide upon the correctness of redaction. In the end of the review, the document is reassembled from the reviewed portions into one single redacted document.

Figure 7:
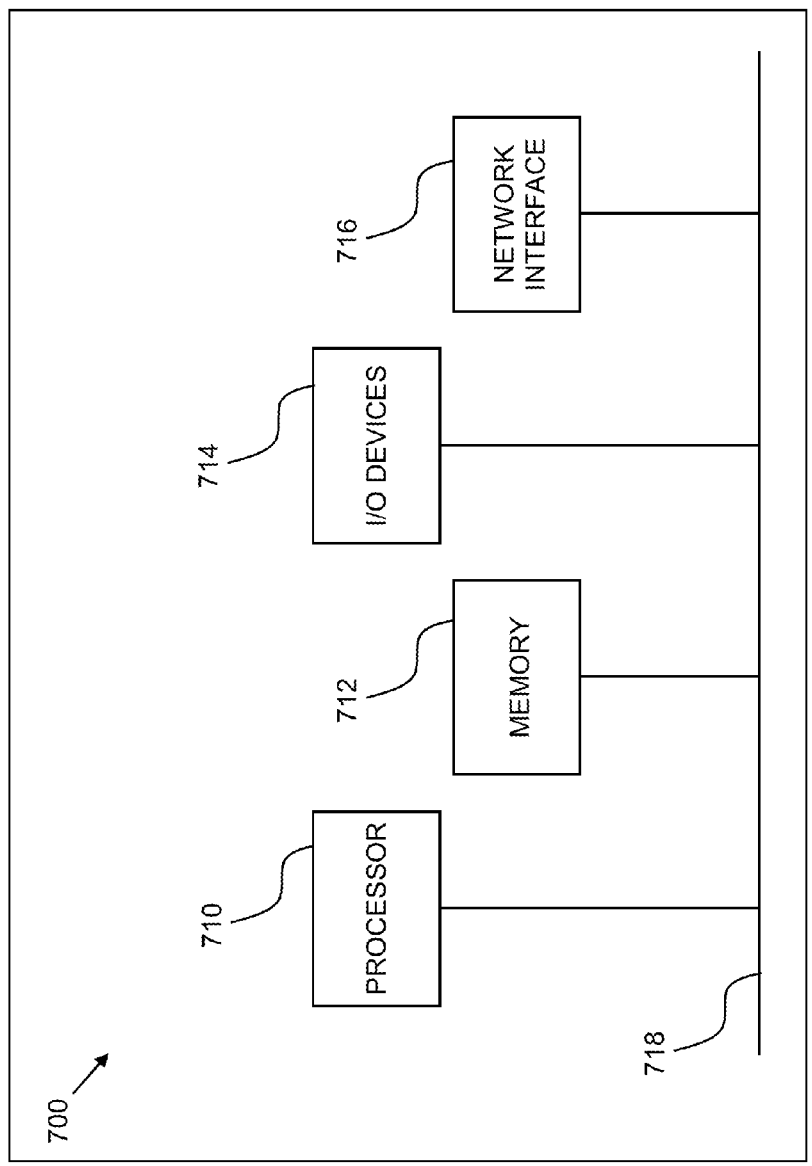
FIG. 7 is a simplified block diagram illustration of an exemplary hardware implementation of a computing system, constructed and operative in accordance with embodiments of the invention.

Referring now to FIG. 7, block diagram 700 illustrates an exemplary hardware implementation of a computing system in accordance with which one or more components/methodologies of the invention (e.g., components/methodologies described in the context of FIGS. 1-6) may be implemented, according to embodiments of the invention.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method, comprising:
   identifying, using a processor of a computer, a first element within a first document that is contextually related to a second element within the first document in accordance with predefined contextual relationship criteria, wherein the first document is stored in a document repository, wherein the first document is a computer-viewable document;
   minimizing, using the processor of the computer, exposure of sensitive information in the first document by creating a second document from the first document by interposing a third element between the first element and the second element, wherein the third element is not interposed between the first element and the second element within the first document, wherein the second document is stored in the document repository, and wherein the second document is a computer-viewable document;
   performing, using the processor of the computer, at least one of replacing any data within the second document with deidentifying data and inserting into the second document data that are not found in the first document;
   receiving, using the processor of the computer, a review action input for the second document, wherein the review action input comprises any of the second document is to be redacted and the second document is correctly redacted; and
   disposing, using the processor of the computer, of the first document in accordance with the review action input for the second document, wherein the disposing is any one of redacting the first document and classifying the first document.

2. The method of claim 1, wherein the third element is from the first document.

3. The method of claim 1, wherein the third element is from a third document.

4. The method of claim 1, wherein the disposing further comprises imposing any one of a security constraint upon the first document and approving the first document.

5. A system comprising:
   a processor; and
   storage coupled to the processor, wherein the storage stores a computer program, and wherein the computer program, when executed by the processor, is configured to perform:
   identifying a first element within a first document that is contextually related to a second element within the first document in accordance with predefined contextual relationship criteria, wherein the first document is stored in a document repository, wherein the first document is a computer-viewable document;
   minimizing exposure of sensitive information in the first document by creating a second document from the first document by interposing a third element between the first element and the second element, wherein the third element is not interposed between the first element and the second element within the first document, wherein the second document is stored in the document repository, and wherein the second document is a computer-viewable document;
   performing at least one of replacing any data within the second document with deidentifying data and inserting into the second document data that are not found in the first document;
   receiving a review action input for the second document wherein the review action input comprises any of the second document is to be redacted and the second document is correctly redacted; and
   disposing of the first document in accordance with the review action input for the second document, wherein the disposing is any one of redacting the first document and classifying the first document.

6. The system of claim 5, wherein the third element is from the first document.

7. The system of claim 5, wherein the third element is from a third document.

8. The system of claim 5, wherein the disposing further comprises imposing any one of a security constraint upon the first document and approving the first document.

9. A computer program product, the computer program product comprising:
   a non-transitory computer readable storage medium; and
   computer readable program code embodied in the non-transitory computer readable storage medium, wherein the computer readable program code is configured to:
   identify a first element within a first document that is contextually related to a second element within the first document in accordance with predefined contextual relationship criteria, wherein the first document is stored in a document repository, wherein the first document is a computer-viewable document;

minimize exposure of sensitive information in the first document by creating a second document from the first document by interposing a third element between the first element and the second element, wherein the third element is not interposed between the first element and the second element within the first document, wherein the second document is stored in the document repository, and wherein the second document is a computer-viewable document;

perform at least one of replacing any data within the second document with deidentifying data and inserting into the second document data that are not found in the first document;

receive a review action input for the second document wherein the review action input comprises any of the second document is to be redacted and the second document is correctly redacted; and dispose of the first document in accordance with the review action input for the second document, wherein the disposing is any one of redacting the first document and classifying the first document.

10. The computer program product of claim 9, wherein the third element is from the first document.

11. The computer program product of claim 9, wherein the third element is from a third document.

12. The computer program product of claim 9, wherein the disposing further comprises any one of imposing a security constraint upon the first document and approving the first document.

* * * * *